(12) United States Patent
Vilei

(10) Patent No.: US 8,789,085 B2
(45) Date of Patent: Jul. 22, 2014

(54) METHOD, SYSTEM AND COMPUTER PROGRAM PRODUCT FOR DETECTING PORNOGRAPHIC CONTENTS IN VIDEO SEQUENCES

(75) Inventor: Antonio Vilei, Lecce (IT)

(73) Assignee: STMicroelectronics S.r.l., Agrate Brianza (MI) (IT)

( * ) Notice: Subject to any disclaimer, the term of this patent is extended or adjusted under 35 U.S.C. 154(b) by 872 days.

(21) Appl. No.: 12/780,750

(22) Filed: May 14, 2010

(65) Prior Publication Data

US 2010/0306793 A1    Dec. 2, 2010

(30) Foreign Application Priority Data

May 28, 2009    (IT) .............................. TO2009A0409

(51) Int. Cl.
*H04N 7/16*    (2011.01)
*H04H 60/32*    (2008.01)

(52) U.S. Cl.
USPC .................................. 725/25; 725/28; 725/19

(58) Field of Classification Search
None
See application file for complete search history.

(56) References Cited

U.S. PATENT DOCUMENTS

| | | | |
|---|---|---|---|
| 7,266,771 B1 * | 9/2007 | Tow et al. ...................... | 715/719 |
| 2004/0208361 A1 * | 10/2004 | Buzuloiu et al. ............... | 382/165 |
| 2005/0196013 A1 * | 9/2005 | Rhoads .......................... | 382/100 |
| 2008/0034396 A1 * | 2/2008 | Lev ................................ | 725/118 |
| 2009/0274364 A1 * | 11/2009 | Shakya et al. .................. | 382/165 |
| 2010/0215104 A1 * | 8/2010 | Osamoto et al. .......... | 375/240.16 |

OTHER PUBLICATIONS

X. Tong, et al. "Periodicity Detection of Local Motion", IEEE International Conference on Multimedia and Expo, 2005, Picataway, NJ, USA, Jul. 6, 2005, pp. 650-653.
N. Rea, et al. Multimodal Periodicity Analysis for Illicit Content Detection in Videos, 3rd European Conference on Visual Media Production, London, UK, Nov. 29-30, 2006, pp. 106-114.
R. Cutler, et al. "Robust Real-Time Periodic Motion Detection Analysis and Applications", IEEE Transactions on Pattern Analysis and Machine Intelligence, vol. 22, No. 8, Aug. 1, 2000.
R. Courday, et al. "Motion Based Segmentation Using MPEG streams and Watershed Method", Advances in Visual Computing Lecture Notes in Computer Science, vol. 3804, Jan. 1, 2005, pp. 729-736.
IT Written Opinion, Italian Patent Application No. TO20090409, May 28, 2009, pp. 1-11.
Italian Office Action, application No. TO2009A000409, dated Sep. 8, 2011, pp. 1.

* cited by examiner

*Primary Examiner* — Brian T Pendleton
*Assistant Examiner* — Jean D Saint Cyr
(74) *Attorney, Agent, or Firm* — Hogan Lovells US LLP

(57) ABSTRACT

A method for detecting the presence of pornographic contents in a sequence of video frames having associated respective motion vectors, includes identifying groups of motion vectors having similar orientation and the presence, in subsequent frames of the sequence, of motion types defined by affiliated groups of motion vectors having homologous motion characteristics in subsequent frames. Thereafter, detection in these motion types of the occurrence of negative affiliations representative of an inversion in the motion of the respective group of vectors. If the number of such negative affiliations counted at a given interval reaches a given count threshold, identified in the sequence of frames is a periodic motion susceptible of having pornographic content. Repetition of the periodic motions may be verified, the image sequence identified as susceptible to having pornographic contents and/or subjected to an optional verification procedure such as "skin detection" type, and transmission may be blocked.

21 Claims, 3 Drawing Sheets

METHOD, SYSTEM AND COMPUTER PROGRAM PRODUCT FOR DETECTING PORNOGRAPHIC CONTENTS IN VIDEO SEQUENCES

RELATED APPLICATION

The present application claims priority of Italian Patent Application No. TO2009A000409 entitled Method And System For Detecting Porn Contents In Video Sequences, Correspondence Computer Program Product, filed May 28, 2009, which is incorporated herein in its entirety by this reference.

FIELD OF THE INVENTION

The present disclosure refers to techniques for detecting pornographic contents in video sequences. This disclosure was developed with particular attention paid to its possible use for automatic detection of pornographic contents in video image sequences transmitted through digital media, and particularly, through the worldwide web.

DESCRIPTION OF THE RELATED ART

The web and—generally—digital media are a widely used diffusion channel for pornographic contents. Thus, various solutions have been proposed with the aim of permitting automatic detection of such video contents such as for possible use in "parental control" systems and the like.

For example, U.S. Pat. No. 6,714,594 describes a technique for video compression implying the calculation of a variety of data that are used in the compression process, with the possibility of using at least some of such data (luminance, motion vector field, residual values, quantization steps, bit rate) for identifying content by identifying the start or the end of a sequence of images having a given type of content. This type of technique does not have the aim of detecting a particular type of content in that it was primarily devised for commercial applications (e.g., identifying advertisements being broadcast, etc.).

U.S. Publication No. 2009/034851 describes systems and methods suitable for classifying a given content as an "adult" content and, if required, blocking it by preventing presentation thereof to a given user. The content received is analyzed using various classification techniques, each of which is implemented only if the previous one does not lead to identifying the content as an "adult" content. The techniques described analyze various characteristics (text, images, etc.). Analysis of video data involves techniques generally known as "skin detection". Such techniques are inherently susceptible to causing a high number of "false positives", signalling as pornographic content an image simply corresponding to a foreground view of a face. The solution presented in U.S. Publication No. 2009/034851 does not take into account the point of the motion of the images.

U.S. Pat. No. 6,904,168 describes a complex solution in which clearly non-pornographic images are identified first in a first stage of analysis of video images by using a plurality of sub-engines each dedicated to different properties of the image. A second step instead requires possible review by a human operator, simplified by having clearly non-critical images previously eliminated. However, this solution (otherwise also suitable to identify copyrighted images) is based on analysis of individual, fixed images, and does not take into account information about motion. Moreover, the analysis is necessarily limited to a subset of the images considered.

The article entitled "Large Scale Image-based Adult-content Filtering", H. A. Rowley, et al., Proceedings of the First International Conference on Computer Vision Theory and Applications VISAPP 2006, pp. 290-296, February 2006, Setubal, Portugal, discloses a method for detecting images having "adult" content by applying a face detection technique alongside various synthetic features calculated, once again, without taking the motion component into account.

N. Rea, et al. "Multimodal Periodicity Analysis for Illicit Content Detection in Videos", IET 3rd European Conference on Visual Media Production CVMP 2006, pp. 106-114, November 2006, London, UK, provides for using motion information. However, the technique described is again based on a "skin detection" technique for distinguishing between foreground images and background images, in such a manner to simplify the analysis of the motion vectors. Applying this technique implies, in the case of encoded digital video images, decoding the flow of images, which requires time (and additional processing costs) and limits the speed of implementation.

Not only are skin detection techniques inherently incapable of analysing black and white images, images involved in the type of detection considered herein often relate to more than two subjects, The skin technique proposed by Rea, et al. is not capable of reliably detecting this kind of situation.

SUMMARY OF THE INVENTION

The preceding discussion of the related art highlights the need of providing solutions capable of overcoming the drawbacks that are intrinsic to the techniques considered beforehand.

The present invention has the object of providing such improved solution.

According to the invention, such object is attained through a method having the characteristics specifically referred to in the claims that follow. The invention also regards a corresponding system, as well as a computer program product, loadable in the memory of at least one computer and including software code portions for performing the steps of the method of the invention when the product is run on at least one computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a modular and/or distributed fashion.

The claims are an integral part of the disclosure of the invention provided herein in relation to the invention.

Various embodiments allow automatic detection of "adult" content videos. Various embodiments exploit the fact that sequences of video images representing a sexual act have an alternating repetitive motion along one or more axes in a fixed region of the screen; by using the information of the motion vectors of the video it is thus possible to detect corresponding motions patterns without having to intervene on the pixel domain and/or in the information frequency domain.

Compared to other solutions, various embodiments significantly improve the performance reducing the number of false positives.

In various embodiments, "skin detection" algorithms may be optionally applied to a small number of images or frames identified through the analysis of motion vectors as likely to contain suspicious pornographic contents; all this in such a manner to further increase the reliability level of the detection indication provided.

Various embodiments exploit the fact that the information on motion vectors is already usually contained in the encoded video files, which avoids having to perform complex calculations on the input data.

Thus, various embodiments overcome the inherent drawbacks related to solutions based on the analysis of meta-textual information and/or static images, by analyzing single images or frames.

Various embodiments avoid the use start/end indicators for detecting a given type of content.

Various embodiments are mainly based on motion, by avoiding the unwanted generation of false positives.

Various embodiments also allow identifying adult contents in a video sequences which involve more than two subjects.

Various embodiments, essentially conceived for detecting "adult" contents, are faster acting than those techniques that do not exploit the distinguishing video encoding characteristics.

In particular, various embodiments may be implemented without requiring decoding the video signal, which leads to high analysis speed and the possibility of subjecting video sequences to verification even at increased speed (for example at 10× speed).

Various embodiments lend themselves to be easily implemented on media players present, for example, in set-top-boxes, mobile devices such as mobile phones, PDAs.

Various embodiments are also suitable for differentiated intervention methods allowing, for example, application on servers intended to enable users to download and/or upload video contents, with the ensuing possibility of countering, limiting or hindering transmission of such contents not only when downloading, but also when uploading on the net.

Various embodiments are suitable to be used in combination with platforms currently used for the distribution of video contents on the web.

Various embodiments offer the possibility of providing "parental control" systems that are reliable and difficult to get around, for example, by simply installing a new media player.

A possible field of application of various embodiments is constituted by devices for distributing media contents (mobile phones, set-top-boxes, residential gateways, etc.) accessible to or intended for children. All this considering the fact that some standards such as the DVB-IPTV standard mandate the use of "parental control" systems, in particular in situations of access to the entirely open internet (Open Internet Content Delivery or OICD).

All this differs from the more conventional techniques based on creating "blacklists" of sites to which access is negated or, in a complementary manner, on setting up "walled gardens", i.e., limited sets of accessible sites. Such techniques, on one hand, have questionable reliability level and, on the other hand, at times excessively limit the freedom of surfing the web by the user.

BRIEF DESCRIPTION OF THE DRAWINGS

Now, the invention shall be described, merely for exemplifying and non-limiting purposes, with reference to the attached representations, wherein.

DETAILED DESCRIPTION OF PREFERRED EMBODIMENTS

Figure 1:
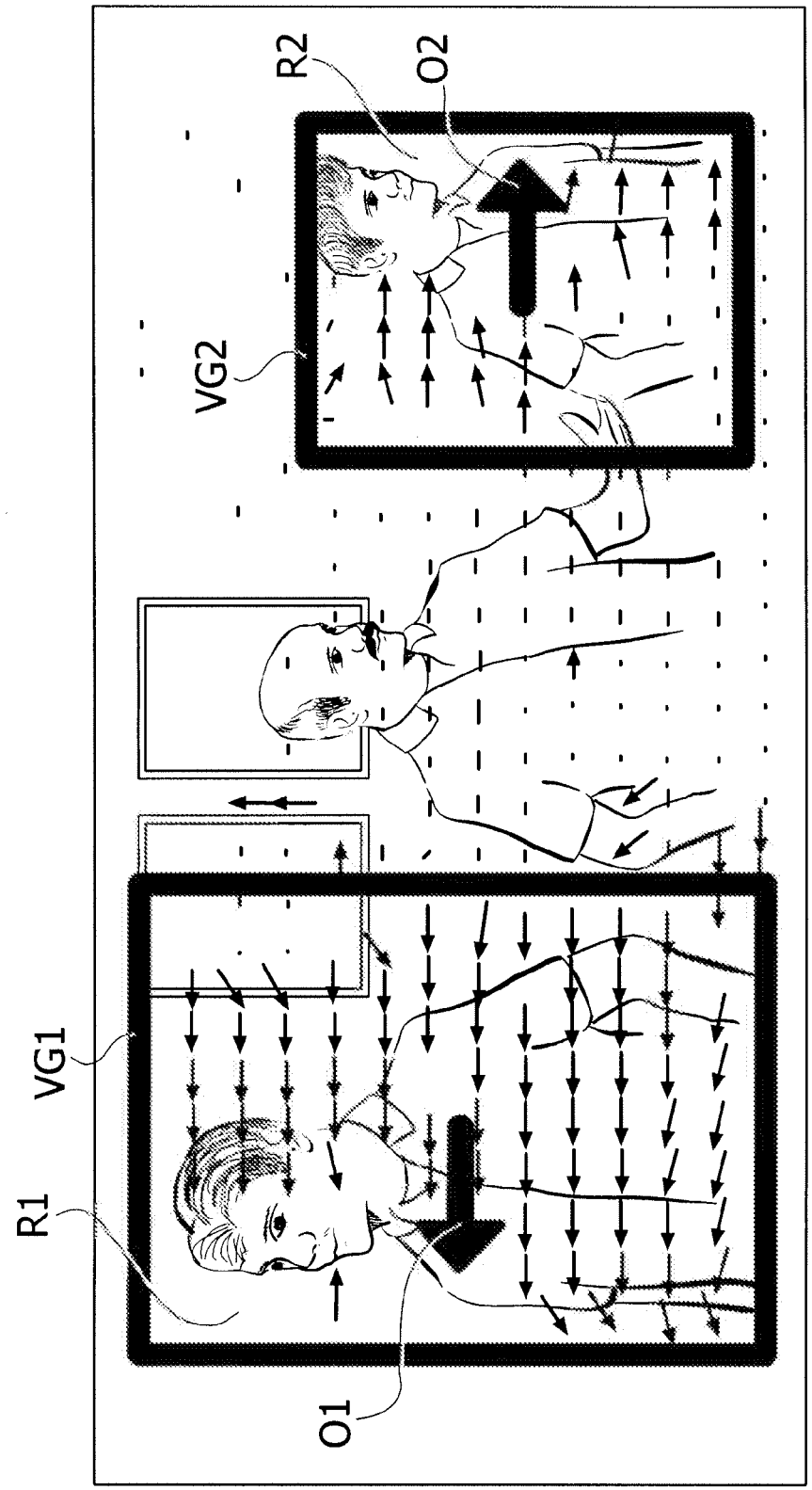
FIG. 1 represents a mechanism for forming groups of motion vectors within an image of a video sequence, FIG. 2 schematically illustrates the mechanism underlying the solution described herein, FIG. 3 schematically illustrates the possible use of a "skin-detection" technique alongside the technique described herein.

Illustrated in the following description are various specific details aimed at an in-depth understanding of the embodiments. The embodiments may be obtained without one or more specific details, or through other methods, components, materials etc. In other cases, known structures, materials or operations are not shown or described in detail to avoid obscuring the various aspects of the embodiments.

Reference to "an embodiment" in this description indicates that a particular configuration, structure or characteristic described regarding the embodiment is included in at least one embodiment. Hence, expressions such as "in an embodiment", possibly present in various parts of this description do not necessarily refer to the same embodiment. Furthermore, particular configurations, structures or characteristics may be combined in any suitable manner in one or more embodiments.

Reference symbols herein are used for the ease of understanding and thus they do not define the scope of protection or the range of the embodiments.

Given the subject in question and the current public availability (possibly on-line) of patent documents once published, supporting the instant description with figures having an "adult" content as intended to be automatically detected herein was deliberately avoided.

The embodiments considered herein are based on the fact that the "adult" or "pornographic" contents (the two terms are used herein as entirely equivalent to each other) are characterised by the presence of a repetitive motion along one (or more) axes in a fixed region of the background. This type of motion is periodic, in that the motion is always inverted periodically: there is motion in one direction, then the motion stops and then it is inverted changing the direction and during these cycles the motion remains substantially parallel to the original axis. The video sequences that represent a sexual act, in all possible variants thereof, are almost inevitably characterized by a periodic motion of this type. The embodiments described herein exploit the information of the motion vectors of the video sequence to identify this kind of motion patterns without requiring performing an analysis in the pixel domain and/or in the frequency domain.

When scenes are changing, the axis of the motion and the region of the screen where the motion considered occurs may change. However, any scene of a pornographic video sequence has a high probability of including a new periodic motion once again.

In contrast, this pattern does not occur in video sequences such as films of another type which may occasionally have alternating motions of the type considered (e.g., the foreground view of a face of an actor who expresses his agreement or disagreement by moving his or her head). Usually, scenes of this type last for a very short period of time and do not characterize the film for an extended period of time.

Still, there may be film sequences that illustrate an alternating motion over a fairly extended period of time such as a film illustrating the operation of a machine or a part of a machine having an alternating motion (e.g., a piston and/or a linkage system). However, the risk of generating a "false positive" by a sequence of this type may be prevented by means of a verification action actuated, for example, by means of a "skin detection" algorithm, capable of easily identifying the subject shown as a machine or a part of a machine moving in an alternating motion.

Figure 4:
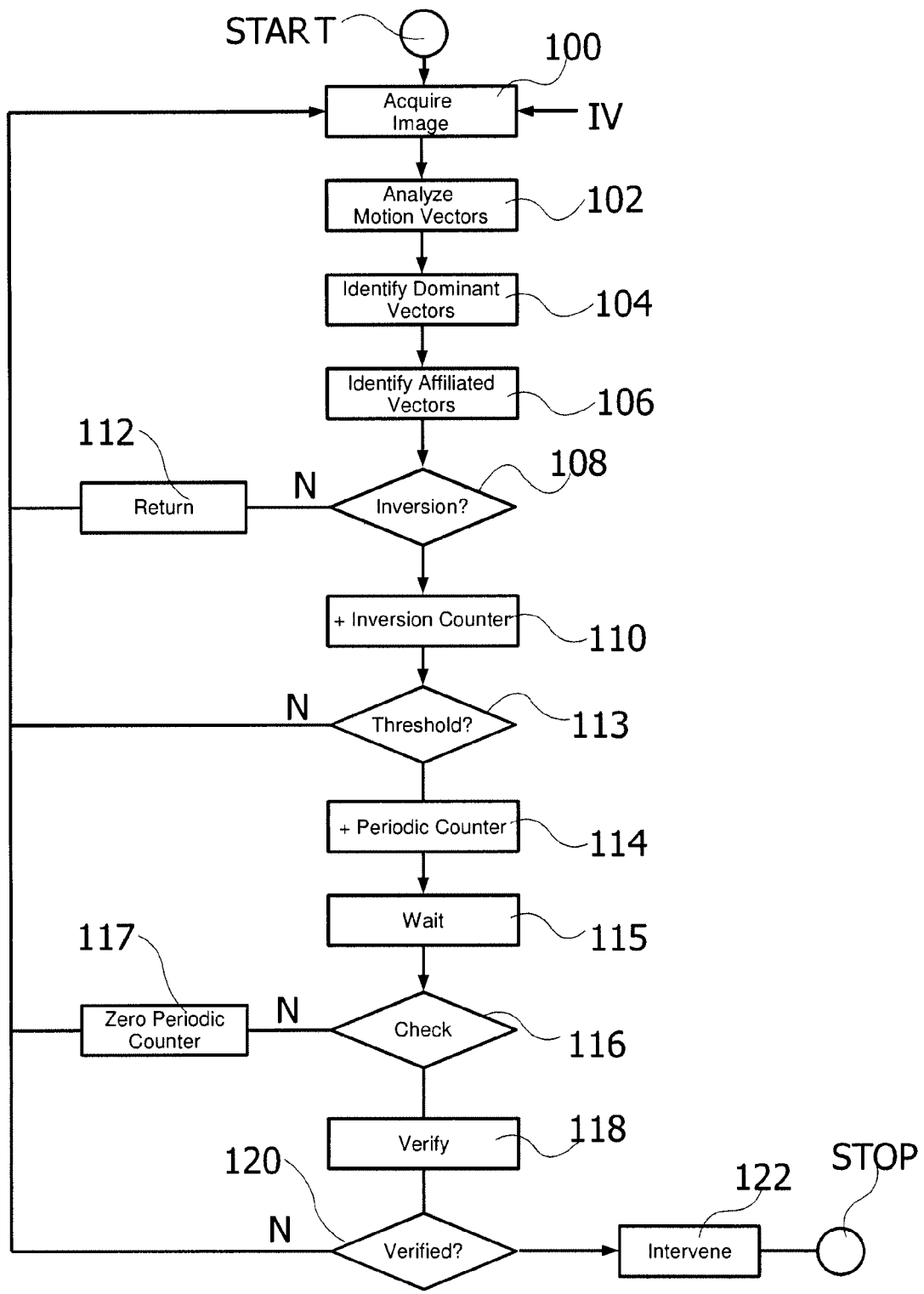
FIG. 4 is a flow chart regarding a possible embodiment of the solution described herein.

The flow chart of FIG. 4 identifies a sequence of signal processing operations suitable to be implemented on any digital calculation device already usually provided for in a system configured (e.g., via software) so as to be able to process digital images, both at the recording/transmission/uploading level and at the reproduction/reception/downloading level onto and/or from any transmission and/or storage means.

After a start step, the acquisition of an image (or, more generally, a frame) of a sequence of input video images IV is carried out in step 100.

In the example considered herein, it is assumed that, as it usually occurs for video sequences conveyed by digital media (e.g., for video sequences downloadable from the web), sequence IV is made up of digital video images encoded using a motion-compensated coding method (according to any known method such as, e.g., those that form the subject of any of the MPEG-2, MPEG-4 or H.264 standards, to name but a few), and thus the bitstream which conveys the video sequence already contains the information regarding the motion vectors on which such encoding is based and such information allows the decoding and displaying of the video sequence.

In step 102, an analysis of the motion vectors present therein is carried out for each image or frame n. This analysis has the aim of allowing identifying groups of vectors according to the methods schematically represented in FIG. 1.

More particularly, FIG. 1 shows two groups of vectors VG1 and VG2 formed by grouping the motion vectors (each regarding a respective macroblock, e.g., of 8×8 or 16×16 pixels) depending on the orientation (i.e., direction and sense or sign), module and position within the screen. In the example illustrated in FIG. 1, the two groups VG1 and VG2 refer to parts of an image which have a global motion respectively leftwards (group VG1) and rightwards (group VG2).

In practice, non-null vectors having similar orientation (direction and sense or sign) and module are grouped together.

Two motion vectors are considered to have a similar orientation if they have the same sense or sign and the difference between their directions is smaller than a given threshold angular value for direction (e.g., in the order of 30°, and possibly adjustable) and they are considered as having similar modules if the difference between their modules is lower than a module threshold (e.g., 3 pixels, also possibly adjustable).

Vectors which, although almost having the same direction, have opposite sense or sign do not have the same orientation and hence they are not grouped together, while null or substantially null vectors (hence expression of a motion intensity below a given minimum threshold motion, possibly adjustable) are usually not taken into account for grouping purposes.

Referring to FIG. 4, in step 104 the method exemplified herein provides for defining, for each group of vectors, a respective frame or image region, such as for example a rectangle R1, R2 (see FIG. 1), wherein the vectors of the group are included as well as a vector count, i.e., the number of similar vectors included in that region.

For each group of vectors VG1, VG2 thus arranged, it is possible to define a global behaviour, represented in FIG. 1 by the two vectors O1 and O2 (represented by arrows enlarged with respect to the single arrows representing single motion vectors), each representing the behaviour of the respective group of motion vectors VG1, VG2.

In an embodiment, vectors O1, O2 represent the general or average behaviour of the respective group of vectors both in terms of orientation (e.g., orientation expressed by a average angular value—referred to any reference system, e.g., the horizontal/vertical coordinate of the images—of the directions of the individual vectors of the group), as well as in terms of module (e.g., as the average value of the modules of the vectors belonging to the group).

Any video frame considered in steps 102 and 104 will usually have more than one group of vectors VG1, VG2, etc. The various groups of vectors VG1, VG2 referred to the same frame may be organized depending on their vector counts, for example allotting to a given group a greater weight with respect to another group as a function on the number of vectors included in such group. Also by way of example and with reference to FIG. 1, the group of vectors VG1 may have a greater weight allotted than the group VG2.

In an embodiment, step 104 (FIG. 4) identifies—for each frame—only one subset of groups of vectors that are most important defined "dominant". In a particularly simplified embodiment, such subset may be reduced to only one dominant group, for example the group of vectors including a greater/maximum number of vectors among all the groups identified.

If a single group of vectors is considered for each frame, it is possible to detect the respective global motion along a single axis, i.e., only in one direction. On the other hand, if multiple groups of vectors are considered for each frame it is possible to detect the respective global motion along plural axes, i.e., plural directions. For example, in the diagram of FIG. 1 the vectors O1 and O2 refer to a situation in which the two groups of vectors VG1 and VG2 are taken into account and the vectors O1 and O2 identify the global motion of group VG1 and group VG2 respectively.

In order to simplify the description, reference hereinafter shall mainly be made to detection of the global motion of a single group of vectors. The criteria for detecting the global motion of plural groups of vectors are easily deducible from the description provided herein.

Regarding the subsequent analysis, it will be considered that, for example, two groups of vectors may be considered parallel if they have a similar motion direction (as defined previously), although having different motion sense or sign. In other words, with respect to parallelism herein, the module of the group of vectors is not particularly important in that parallel groups of vectors may have different modules.

In step 106, groups of vectors belonging to subsequent frames but having homologous motion characteristics may be considered "affiliated", i.e., having characteristics such as to meet, for example, the following conditions:
    the groups are parallel to each other,
    the difference between the areas of the regions (e.g. R1) occupied thereby is lower than a given area threshold (e.g. in percentage, possibly adjustable), and
    the distance between their regions is lower than a given distance threshold (e.g., in percentage, possibly adjustable).

Two groups of affiliated vectors are affiliated positively if the groups of vectors have concordant directions while they are considered as affiliated negatively if the groups of vectors have opposite directions.

Step 106, dedicated to the analysis of the motion type, aims at identifying and following the evolution of the groups of vectors over time and thus considers the results obtained subsequently in steps 102 and 104 analysing subsequent frames.

A "motion type" is identified by a set of affiliated groups of vectors belonging to subsequent frames. In the embodiment considered herein, a motion type cannot have more than one group of vectors belonging to the same frame.

In practice, a "motion type" identifies the movements of a given group of vectors (e.g., VG1 in FIG. 1) over time, by observing the motions of the respective vector O1) in subsequent frames. This if for the purpose of determining whether a given group of vectors (i.e., a given part of image) follows over time an alternating motion, to and fro, as schematically represented in FIG. 2.

Figure 2:

FIG. 2 schematically illustrates, as an example, the evolution in function of time, i.e. in subsequent frames of the sequence, of a group of vectors identified regarding its global characteristics of movement—orientation (including the direction) and module—from a direction vector and global module O1. It should be borne in mind that such group (e.g., VG1 in FIG. 1) was identified by grouping similar motion vectors according to orientation and module, i.e., motion vectors having concordant direction hence the differences between the directions and the modules of the grouped vectors are lower than respective, possibly adjustable direction and module thresholds.

FIG. 2 schematically illustrates the behaviour of a motion type defined by means of an affiliation mechanism, wherein in subsequent frames (from the top towards the bottom, in the illustrated example) the possibility exists of identifying "affiliated" groups of motion vectors, in that they have, in subsequent frames, homologous motion characteristics. By way of example, affiliated groups of motion vectors are parallel to each other, the difference between the areas of the frame regions occupied by affiliated groups of motion vectors is smaller than an area threshold, possibly adjustable, and the distance between the centres of the areas of the frame regions occupied by affiliated groups of motion vectors is lower than a distance threshold, possibly adjustable. FIG. 2 further schematically shows that in subsequent frames it is possible to identify (for the sake of simplicity, the example illustrated refers to only one group of motion vectors, for example VG1, identified by the global vector O1) at least one group of motion vectors that is the "son" (filius) of a homologous group of motion vectors in the previous frame, in that it substantially represents the same image portion. The affiliation mechanism allows observing how a given group of motion vectors (i.e. a certain image portion) moves in subsequent frames.

The affiliation mechanism may occur in two manners: positive affiliation and negative affiliation.

Positive affiliation occurs when between a group of motion vectors in a frame and the affiliated group in a subsequent frame—such groups being parallel to each other in that their global directions (vector O1) differ by less than a parallelism threshold, possibly adjustable—no inversion of the motion takes place, i.e. no change of the direction of motion occurs. See, for example, the first two images of FIG. 2.

Conversely, negative affiliation occurs when there is an inversion of the motion between a group of motion vectors in a frame and the affiliated group in a subsequent frame, i.e. there is a change of the motion direction: see for example the change of direction of the vector O1 between the second and the fourth image of FIG. 2, where possible "stationary" frames may not be considering, for the purpose of detecting motion inversion.

Thus, during step 106, for the or for each dominant group of vectors, a respective motion type is identified and the negative affiliations are detected for each motion type, i.e., those situations wherein the group of vectors that identifies the motion type changes the direction of motion.

An inversions counter representing the number of inversions of the motion over time is identified for each motion type. This counter is initially set at zero, and each time a group of vectors is added to a motion type, a check is made (in a step 108) as to whether the added group of vectors is negatively affiliated to the previous one. Should that be the case, an inversion of the motion has occurred and, in a step 110, the inversion counter is increased by 1.

However, should the check in step 108 yield a negative outcome, in the sense that the new group of vectors added to a motion type is positively affiliated to the previous one, i.e., there has been no inversion of the motion, the system simply returns, through a step 112, to step 100 in which another frame of the sequence IV is extracted to be analyzed.

Step 112 represents the fact that, by repeating the sequence of the steps illustrated previously with reference to subsequent frames of the video sequence IV, all the "old" motion types are deleted, such as for example, those motion types to which no new dominant groups of vectors have been added over a given number of frames.

Thus, as already mentioned, the step of analysing the motion type aims at identifying and following the evolution of the groups of vectors over time and thus considers the results subsequently obtained in steps 102 and 104 by analyzing subsequent frames.

In an embodiment, when the analysis of a given video sequence IV starts, the dominant group of vectors of the first frame may be taken to create a first motion type. Then the dominant group of vectors of the second frame is taken and, if affiliated to the previous one, this new group of vectors is added to the previous one.

Otherwise, another motion type is created for the new group of vectors and this procedure continues until the video sequence ends or until the inversions counter reaches a count threshold value, such event occurring in a step 113.

In order to minimise the risk of generating false positives, i.e., erroneously identifying a video not containing pornographic contents as one having such contents, a count of the consecutive periodic motions at a given range of time is thus carried out.

This operation is carried out by means of the inversions counter 110 which is initially set to zero and increased each time the step 108 indicates a negative affiliation, i.e., a change of the direction of motion.

As long as the counter increased in step 110 has a counting value lower than a determined inversions count threshold value (possibly variable, the same being the case for all the other threshold values considered herein, depending on whether one wants to favour the "sensitivity" of the system or minimize the risk of "false positives"), i.e., as long as a verification step 113 gives a negative response, the system returns to step 100, in such a manner to accumulate other information regarding the frames sequence.

The positive response of step 113 indicates the fact that a periodic to and fro motion (see FIG. 2) was observed in a determined region of the screen. When step 113 indicates the fact that the inversions counter has exceeded the respective threshold, the counting value of a further counter, initially set to zero in a step 114, is increased and increased each time the step 113 indicates that a periodic motion has been identified.

A waiting step 115 follows, whose duration may be variable, definable both as the time interval and as the number of frames. Then, in step 116, the system checks whether at least another periodic motion likely (at least potentially) to contain pornographic content has been identified during the waiting period.

If step 116 gives a negative response, in step 117 the periodic motions counter (previously modified in step 114) is zeroed and the system returns to step 100.

If the step 116 gives a positive response, confirming the fact that at least two periodic motions (e.g., before and after a scene change) likely to contain pornographic contents have been detected subsequently, the system activates an intervention step 118.

In various embodiments, step 118 may directly correspond to the step 122 better described hereinafter.

In the embodiment referred to by the flow chart of FIG. 4, the positive response of step 116 (corresponding to the "suspicion" that the sequence IV contains pornographic contents, in that several periodic motions have been detected in the sequence over a given period of time) activates—in step 118—a procedure aimed at confirming or corroborating the suspicion that the sequence IV may contain pornographic contents.

Figure 3:
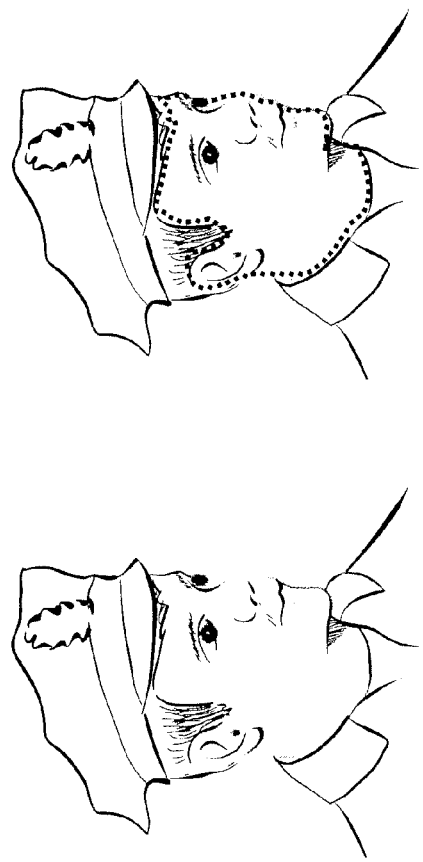

The procedure in question may be, for example, a "skin detection" procedure susceptible, as schematically illustrated in FIG. 3, to isolate the parts of an image containing the typical characteristics (e.g., chromatic contents typical of melanin, regardless of the skin color) of human skin.

The procedure possibly carried out in step 118 may also use—according to known criteria—context data such as, for example, information regarding the type of video program deducible from the program itself which allow excluding non-pornographic sequences from erroneous classification as pornographic sequences.

It shall be observed that the procedure possibly carried out in step 118 may also involve only one part of the images of the sequence IV (ideally even one image alone), which makes the corresponding analysis easy and quick to implement, as well as light from a computational point of view.

The different response of the further verification possibly carried out in step 118 (i.e., excluding the fact that one has to deal with a pornographic video sequence—negative response of step 120—or confirmation that one has most likely to deal with a sequence of such type—positive response of step 120) either leads to returning to the previous analysis steps or to an actual intervention step 122, with the subsequent completion (stop) of the analysis sequence.

The action carried out in step 122 may be of different scopes, possibly programmable.

For example, the intervention carried out in step 122 may correspond to a simple interruption or prohibition from recording, transmitting, uploading, reproducing, receiving or downloading the video sequence.

The intervention may include emitting a message that makes the possibility of completing the activity in progress conditional to the introduction, by the user, of specific authorization keys. The intervention may correspond to the emission of a warning message forwarded to another user assigned the task of supervising (e.g., a parent of a minor trying to download a given film, or a supervising station with a provider entrusted with the task of barring uploading and/or transmission of given types of videos through the terminals under its authority).

The solution described previously is suitable to be used even for video sequences that are not originally encoded using a motion-compensated coding method. These video sequences, which initially do not contain information regarding motion vectors, may be subjected, also only partly, to motion estimation (with the ensuing calculation of motion vectors) in such a manner to create a sequence IV adopted to be processed according to the methods described previously.

This possibility aims at considering the fact that, for example in the case of a personal computer, a parent may think of installing a player equipped with a "parental control" function; this ensures that a minor cannot watch pornographic films using that player.

However, in open environments such as PCs, the user may install different software, such as for example another player not equipped with a "parental control" function. Some software players may be executed simply by running an executable file without any installation. If the minor uses such a player, there is no way a parent can prevent him from watching a pornographic film, not even by creating a user account with limited privileges.

However, regardless of the video player used, the video frames end up in the memory of the video card. Thus, the solution described herein may be used for analysing over time the content of the video card memory instead of the video files to be reproduced.

At a given point, the video card memory content may be seen as a source video frame on which detection of possible pornographic contents may be carried out. All this with the impossibility of getting around such detection action carried out at the video card level. However, the video card does not have the information regarding motion vectors, while a video player does indeed use the motion vectors already present in the encoded video file.

Thus, the motion vectors may be calculated starting from the video card content in such a manner to obtain a sequence IV containing the information regarding motion vectors to be subjected to the method described previously.

Performing this motion estimation operation at the video card level may be demanding from a computational point of view. However, the motion estimation may be applied simply to a part of the information that passes through the video card. For example, such process may start by first applying to the information that passes through the video card a skin detection procedure (skin tone detection) and trigger motion estimation only if the skin detection function generates an alarm, indicating the suspicion of the possible presence of pornographic contents. In that manner, motion analysis is carried out only when such suspicion arises, by way of possible confirmation. In that case, the verification step 118 described previously with reference to FIG. 4 is usually omitted, in that this has been carried out previously.

It is also observed that the motion estimation function, aimed at generating information regarding motion vectors for use in the process described previously may be carried out even only on a sub-sampled version of the information that passes through the video card, hence reducing computational costs and making the motion estimation function quicker.

Obviously, without prejudice to the underlying principle of the invention, the details and embodiments may vary, even significantly, with respect to what has been described herein by way of non-limiting example only, without departing from the scope of the invention as defined by the attached claims. For example, it shall be observed that, in a simpler embodiment, by accepting a slight increase of the risk of generating "false positives", steps 114, 115, 116 and 117 may be skipped by passing directly to the (possible) verification 118, 120 and intervention step 122, directly depending on the positive response of step 113 (corresponding to the detection of a to and fro periodic motion).

The invention claimed is:

1. A non-transitory computer program product, stored in the memory of at least one computer and including software code portions for performing a method of detecting pornographic contents in a sequence of video frames having associated respective motion vectors, the method including:
   identifying in said frames groups of motion vectors having similar orientation and module,
   identifying the presence in subsequent frames in said sequence, of motion types defined by groups of motion vectors affiliated as having homologous motion characteristics in subsequent frames,
   detecting, in said motion types, the occurrence of negative affiliations representative of an inversion in the movement of the corresponding group of vectors,
   counting the number of said negative affiliations over a given interval, and if the number of negative affiliations counted reaches a given count threshold, identifying in said sequence of frames a periodic movement susceptible of having pornographic content;
   wherein the sequence of video frames represents a sexual act having an alternating repetitive motion along one or more axes in a fixed region of a screen, and wherein using the information of the motion vectors of the video corresponding motion patterns are detected without having to intervene on the pixel domain and/or in the information frequency domain.

2. The non-transitory computer program product of claim 1, including identifying said groups of motion vectors having similar orientation and module as groups including motion vectors having a concordant direction for which the differences between the orientations and modules of said motion vectors are lower than respective orientation and module thresholds.

3. The non-transitory computer program product of claim 2, wherein one or both of the orientation and module thresholds are adjustable.

4. The non-transitory computer program product of claim 1 further comprising identifying said types of motion as including groups of motion vectors affiliated as having in subsequent frames the homologous motion characteristics comprising (a) the groups of motion vectors affiliated are parallel to each other, (b) a difference between the areas of the frame regions occupied by groups of motion vectors being affiliated is lower than an area threshold, and (c) a distance between the centres of the frame regions occupied by groups of motion vectors is lower than a distance threshold.

5. The non-transitory computer program product of claim 4, wherein the one or both of the area threshold and the distance threshold are adjustable.

6. The non-transitory computer program product of claim 1 further comprising defining for said groups of motion vectors, at least one of global orientation and module representative of the global motion characteristics of the group.

7. The non-transitory computer program product of claim 6, including defining said at least one of said global orientation and module as an average of the orientations and modules of the vectors included in the group.

8. The non-transitory computer program product of claim 7 further comprising considering as parallel to each other groups of motion vectors whose global orientations differ for less than a parallelism threshold.

9. The non-transitory computer program product of claim 8, wherein the parallelism threshold is adjustable.

10. The non-transitory computer program product of claim 1 further comprising:
   selecting, out of the groups of motion vectors having similar orientation and module identified in said frames, a subset of dominant groups of motion vectors, and
   identifying said motion types, detecting the occurrence of said negative affiliations and counting the number of said negative affiliations only in respect of said subset of dominant groups of motion vectors.

11. The non-transitory computer program product of claim 10, including selecting said subset of dominating groups of motion vectors as a function of the number of motion vectors included in said groups of motion vectors identified as similar in said frames, preferably by allotting a dominant character to group including a larger number of vectors.

12. The non-transitory computer program product of claim 1, wherein following identification in said sequence of frames of at least one periodic movement susceptible of having pornographic content, performing at least a countering action to further diffusion of said sequence of frames.

13. The non-transitory computer program product of claim 1, including:
   verifying the subsequent repeated identification in said sequence of frames of at least two periodic movements susceptible of having pornographic content, and
   performing said at least one countering action to further diffusion of said sequence of frames only in the presence of said subsequent repeated identification in said sequence of frames of at least two periodic movements susceptible of having pornographic content.

14. The non-transitory computer program product of claim 1, further comprising:
   performing on at least subset of the frames in the sequence, following identification in said sequence of frames of at least one periodic movement susceptible of having pornographic content, a complementary verification procedure, of the possible pornographic content, and
   performing said at least one countering action only if said complementary verification procedure confirms the possible pornographic content of the sequence.

15. The non-transitory computer program product of claim 14, wherein said countering action is selected from:
   inhibiting further transmission of said sequence of frames,
   conditioning further transmission of said sequence of frames to a message input by the user, and
   sending an advisory message to a monitoring station.

16. A computer-implemented method of analysing the content of a video card memory for detecting pornographic contents in a sequence of video frames not having associated respective motion vectors, the method including:
   performing motion analysis on a subset of the video sequence to generate motion vectors,
   identifying in said frames groups of motion vectors having similar orientation and module,
   identifying the presence in subsequent frames in said sequence, of motion types defined by groups of motion vectors affiliated as having homologous motion characteristics in subsequent frames,
   detecting, in said motion types, the occurrence of negative affiliations representative of an inversion in the movement of the corresponding group of vectors,
   counting the number of said negative affiliations over a given interval, and
   if the number of negative affiliations counted reaches a given count threshold, identifying in said sequence of frames a periodic movement susceptible of having pornographic content, wherein the sequence of video frames represents a sexual act having an alternating repetitive motion along one or more axes in a fixed region of a screen, and wherein using the information of the motion vectors of the video corresponding motion patterns are detected without having to intervene on the pixel domain and/or in the information frequency domain.

17. The computer-implemented method of claim 16, wherein the subset of the video sequence upon which the step of performing motion analysis is conducted is downsampled.

18. The computer-implemented method of claim 16, including identifying said groups of motion vectors having similar orientation and module as groups including motion vectors having a concordant direction for which the differences between the orientations and modules of said motion vectors are lower than respective orientation and module thresholds.

19. The computer-implemented method of claim 18, wherein one or both of the orientation and module thresholds are adjustable.

20. The computer-implemented method of claim 16 further comprising identifying said types of motion as including groups of motion vectors affiliated as having in subsequent frames the homologous motion characteristics comprising (a) the groups of motion vectors affiliated are parallel to each other, (b) a difference between the areas of the frame regions occupied by groups of motion vectors being affiliated is lower than an area threshold, and (c) a distance between the centres of the frame regions occupied by groups of motion vectors is lower than a distance threshold.

21. The computer-implemented method of claim 20, wherein the one or both of the area threshold and the distance threshold are adjustable.

* * * * *